United States Patent
Dong et al.

(10) Patent No.: US 11,838,208 B2
(45) Date of Patent: Dec. 5, 2023

(54) CONGESTION CONTROL METHOD AND APPARATUS, DEVICE, AND STORAGE MEDIUM

(71) Applicant: Huawei Technologies Co., Ltd., Shenzhen (CN)

(72) Inventors: Jianbo Dong, Shenzhen (CN); Binzhang Fu, Beijing (CN); Kun Tan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 17/087,931

(22) Filed: Nov. 3, 2020

(65) Prior Publication Data

US 2021/0051102 A1 Feb. 18, 2021

Related U.S. Application Data

(63) Continuation of application No. PCT/CN2019/074385, filed on Feb. 1, 2019.

(30) Foreign Application Priority Data

May 4, 2018 (CN) .......................... 201810421769.9

(51) Int. Cl.
*H04L 47/70* (2022.01)
*H04L 47/12* (2022.01)
(Continued)

(52) U.S. Cl.
CPC ............ *H04L 47/12* (2013.01); *H04L 5/0055* (2013.01); *H04L 47/193* (2013.01); *H04L 47/27* (2013.01)

(58) Field of Classification Search
None
See application file for complete search history.

(56) References Cited

U.S. PATENT DOCUMENTS

| 8,462,631 B2* | 6/2013 | Plamondon ............. H04L 47/10 370/395.42 |
| 9,106,546 B1 | 8/2015 | Naik et al. |

(Continued)

FOREIGN PATENT DOCUMENTS

| CN | 101964755 A | 2/2011 |
| CN | 101977151 A | 2/2011 |

(Continued)

OTHER PUBLICATIONS

Das, T., "TCP improvements for Data Center Networks," Fifth International Conference on Communication Systems and Networks (COMSNETS), Feb. 21, 2013, 10 pages.

(Continued)

*Primary Examiner* — Willie J Daniel, Jr.
(74) *Attorney, Agent, or Firm* — Conley Rose, P.C.

(57) ABSTRACT

A congestion control method and apparatus, a device, and a storage medium, where the congestion control method includes sending first data packets to a receive end, where a quantity of the first data packets is the first value, receiving a plurality of second data packets corresponding to all or a portion of the first data packets, where the second packets include one or more third data packets and one or more fourth data packets, and adjusting, by a transmit end, a congestion window based on the second data packets to adjust a value of the congestion window to a second value.

20 Claims, 4 Drawing Sheets

(51) Int. Cl.
   *H04L 5/00*      (2006.01)
   *H04L 47/193*    (2022.01)
   *H04L 47/27*     (2022.01)

(56) References Cited

U.S. PATENT DOCUMENTS

| | | | |
|---|---|---|---|
| 2006/0250949 | A1* | 11/2006 | Ramakrishnan ...... H04W 28/10 370/216 |
| 2011/0211449 | A1 | 9/2011 | Attar et al. |
| 2014/0126357 | A1 | 5/2014 | Kulkarni et al. |
| 2017/0093699 | A1 | 3/2017 | Crupnicoff et al. |

FOREIGN PATENT DOCUMENTS

| | | | |
|---|---|---|---|
| CN | 102204182 | A | 9/2011 |
| CN | 103051555 | A | 4/2013 |
| CN | 103297346 | A | 9/2013 |
| CN | 103581035 | A | 2/2014 |
| CN | 103905327 | A | 7/2014 |
| CN | 104796350 | A | 7/2015 |
| CN | 107800642 | A | 3/2018 |
| JP | 2011188429 | A | 9/2011 |

OTHER PUBLICATIONS

Sreekumari, P., "An early congestion feedback and rate adjustment schemes for many-to-one communication in cloud-based data center networks," Jul. 12, 2015, 14 pages.

Zhu, Y., et al., "Congestion Control for Large-Scale RDMA Deployments," SIGCOMM 15, Aug. 17-21, 2015, ondon, United Kingdom, 2015 ACM. ISBN 978-1-4503-3542-3/15/08 . . . $15.00, DOI: http://dx.doi.org/10.1145/2785956.2787484, 14 pages.

Alizadeh, M., et al, "Data Center TCP (DCTCP)," SIGCOMM 10, Aug. 30-Sep. 3, 2010, New Delhi, India., Copyright 2010 ACM 978-1-4503-0201-2/10/08 . . . $10.00., 12 pages.

Hu, S., et al, "Deadlocks in Datacenter Networks: Why Do They Form, and How to Avoid Them," HotNets-XV, Nov. 9-10, 2016, Atlanta, GA, USA 2016 ACM. ISBN 978-1-4503-4661-0/16/11 . . . $15.00, DOI: http://dx.doi.org/10.1145/3005745.3005760, 7 pages.

Handley, M., et al, "Re-architecting datacenter networks and stacks for low latency and high performance," 2017 Copyright held by the owner/author(s). Publication rights licensed to Association for Computing Machinery. ACM ISBN 978-1-4503-4653-5/17/08 . . . $15.00 https://doi.org/10.1145/3098822.3098825, 14 pages.

Floyd, S., et al, "Quick-Start for TCP and IP," RCF 4782, Jan. 2007, 82 pages.

Chu, J., et al, "Increasing TCP's Initial Window," RFC 6928, Apr. 2013, 24 pages.

Cheng, Y., et al, "TCP Fast Open," RFC 7413, Dec. 2014, 26 pages.

Padmanabhan, V., et al., "TCP Fast Start: A Technique for Speeding Up Web Transfersz," In Proc. IEEE Globecom 98 Internet Mini-Conference, Sydney, Australia, Nov. 1998, 6 pages.

* cited by examiner

CONGESTION CONTROL METHOD AND APPARATUS, DEVICE, AND STORAGE MEDIUM

CROSS-REFERENCE TO RELATED APPLICATION

This application is a continuation of International Patent Application No. PCT/CN2019/074385 filed on Feb. 1, 2019, which claims priority to Chinese Patent Application No. 201810421769.9 filed on May 4, 2018. The disclosures of the aforementioned applications are hereby incorporated by reference in their entireties.

TECHNICAL FIELD

This application relates to the field of network communications technologies, and in particular, to a congestion control method and apparatus, a device, and a storage medium.

BACKGROUND

With development of network communications technologies, services of cloud computing and big data are widely applied. To meet requirements of a large quantity of users for the services of cloud computing and big data, a large quantity of data centers (DCs) are established. There is a large quantity of servers connected to each other through a data center network in each data center. Many application services, such as an online search service and a social network service, provided by the server require a low-delay network.

In an existing flow control method, a transmit end of a connection uses a Data Center Quantized Congestion Notification (DCQCN) as a congestion control policy based on a packet returned by a receive end, and adjusts a transmit rate of the transmit end according to the policy, to control data transmission over the connection to avoid connection congestion. However, using such a congestion control policy cannot ensure stability of data transmission, and transmission performance over the connection is poor. Further, in a data transmission process, there is a high probability that congestion occurs, a packet loss is prone to occur, and a packet loss rate is high.

SUMMARY

This application provides a congestion control method and apparatus, a device, and a storage medium, to more accurately adjust a congestion window of a transmit end. Using such a congestion window to send data can reduce a probability of connection congestion. When no control is performed on a switching node, the switching node is enabled to have a stable and shallow queue depth of to-be-forwarded data, thereby reducing a packet loss in a network and improving network stability.

According to a first aspect, this application provides a congestion control method, and the congestion control method includes the following.

A transmit end sends, over a connection between the transmit end and a receive end, a plurality of data packets to the receive end in a congestion window, where a quantity of the plurality of data packets is a first value, the first value is a value of the congestion window of the connection, and the connection is in a congestion avoidance state. The transmit end receives, from the receive end, a plurality of packets corresponding to all or a portion of the plurality of data packets, where the plurality of packets include one or more first packets and one or more second packets, the first packet is used to indicate that congestion occurs over the connection when one or more of the plurality of data packets are transmitted, and the second packet is used to indicate that no congestion occurs over the connection when one or more of the plurality of data packets are transmitted. The transmit end adjusts the congestion window based on the plurality of packets, to adjust the value of the congestion window to a second value, where the first packet in the plurality of packets enables the value of the congestion window to decrease, and the second packet in the plurality of packets enables the value of the congestion window to increase.

In the foregoing method, both the first packet and the second packet corresponding to the congestion window affect the congestion window, and therefore the second value may be greater than or less than the first value or the first value may be equal to the second value even in some cases.

Congestion occurs over the connection when the one or more of the plurality of data packets are transmitted. In an implementation, a switching node or the receive end over the connection may determine that congestion occurs in the transmission process of the one or more data packets. Correspondingly, congestion does not occur over the connection when one or more of the plurality of data packets are transmitted. In an implementation, any switching node or the receive end over the connection does not obtain or generate, in the transmission process of the one or more data packets, information used to indicate congestion.

One first packet may correspond to one or more data packets, and one second packet may also correspond to one or more data packets. The second packet may be an acknowledgement (ACK) character of a data packet or other information. The first packet may be a dedicated-format packet used to indicate network congestion. For example, the first packet may be a congestion notification packet (CNP).

In an implementation, all the plurality of packets may be ACK packets, each of the packets is further used to indicate that a specific quantity of data packets in the plurality of data packets arrive at the receive end, and the specific quantity is one or more. The first packet carries a congestion echo flag, and the second packet does not carry a congestion echo flag. The first packet indicates network congestion through a congestion flag. For example, the congestion echo flag may be a label marked in the ACK based on an Explicit Congestion Notification Echo (ECE) technology.

The first packet and the second packet together reflect severity of overall network congestion. The transmit end may proportionally decrease and increase the value of the congestion window based on the severity of overall network congestion together reflected by the first packet and the second packet. In this way, the value of the congestion window is adjusted at a finer granularity, and a network can quickly respond to network congestion. When the transmit end continuously adjusts the value of the congestion window, the queue depth of the switching node is controlled, to obtain a comparatively shallow and stable queue depth. This reduces a packet loss in the network, avoids an abrupt change in network performance, and improves network stability. This ensures a sufficient queue buffer of the switching node and reduces a delay in a data transmission process. In addition, the queue depth of the switching node is kept at a stable value, to ensure that there is always a data packet in a queue, thereby improving network bandwidth utilization, and maintaining high-bandwidth data transmission in the network. In an implementation, one first packet in the plurality of packets enables the value of the congestion window to decrease by a third value, one second packet in the plurality of packets enables the value of the congestion window to increase by a fourth value, the third value is related to a quantity of data packets that the first packet corresponds to, and the fourth value is related to a quantity of data packets that the second packet corresponds to.

The quantity of data packets that the first packet corresponds to and the quantity of data packets that the second packet corresponds to may precisely reflect the severity of network congestion. The transmit end decreases the value of the congestion window by the third value related to the quantity of the data packets that the first packet corresponds to, and increases the value of the congestion window by the fourth value related to the quantity of the data packets that the second packet corresponds to such that the congestion window is adjusted at a finer granularity. That is, the queue depth of the switching node is controlled more precisely. This can further reduce a packet loss and improve network stability.

In an implementation, the second value is a sum of the first value, an opposite number of a first sum, and a second sum, where the first sum is a sum of third values corresponding to all first packets in the plurality of packets, and the second sum is a sum of fourth values corresponding to all second packets in the plurality of packets.

In a possible implementation, the fourth value is further related to the first value and an increase factor.

In an implementation, that the transmit ends adjusts the congestion window based on the plurality of packets includes that the transmit end decreases the value of the congestion window by the third value based on the one first packet in the plurality of packets, and the transmit end increases the value of the congestion window by the fourth value based on the one second packet in the plurality of packets. Adjusting the value of the congestion window in real time ensures that the value of the congestion window is adjusted in time such that the network can respond to network congestion more quickly, and network stability can be further improved.

In an implementation, that the transmit end adjusts the congestion window based on the plurality of packets includes that the transmit end calculates the second value based on a quantity of the first packets, an amount by which the value of the congestion window is enabled to be decreased by each of the first packets, a quantity of the second packets, and an amount by which the value of the congestion window is enabled to be increased by each of the second packets, and the transmit end adjusts the value of the congestion window from the first value to the second value. Adjustment is performed on the congestion window after the second value is calculated based on the plurality of packets. This can prevent the congestion window from being frequently adjusted, and is more convenient.

In an implementation, the method further includes sending the plurality of data packets whose quantity is the second value to the receive end over the connection.

According to a second aspect, this application provides a congestion control apparatus. The apparatus includes a sending module configured to send, over a connection between the transmit end and a receive end, a plurality of data packets to the receive end in a congestion window, where a quantity of the plurality of data packets is a first value, the first value is a value of the congestion window of the connection, and the connection is in a congestion avoidance state, a receiving module configured to receive, from the receive end, a plurality of packets corresponding to all or a portion of the plurality of data packets, where the plurality of packets include one or more first packets and one or more second packets, the first packet is used to indicate that congestion occurs over the connection when one or more of the plurality of data packets are transmitted, and the second packet is used to indicate that no congestion occurs over the connection when one or more of the plurality of data packets are transmitted, and a controlling module configured to adjust the congestion window based on the plurality of packets, to adjust the value of the congestion window to a second value, where the first packet in the plurality of packets enables the value of the congestion window to decrease, and the second packet in the plurality of packets enables the value of the congestion window to increase.

In an implementation, the first packet is a CNP, and the second packet is an ACK character.

In an implementation, the plurality of packets are ACK packets, each of the ACK packets is further used to indicate that a specific quantity of data packets in the plurality of data packets arrive at the receive end, where the specific quantity is one or more. The first packet carries a congestion echo flag, and the second packet does not carry a congestion echo flag.

In an implementation, one first packet in the plurality of packets enables the value of the congestion window to decrease by a third value, one second packet in the plurality of packets enables the value of the congestion window to increase by a fourth value, the third value is related to a quantity of data packets that the first packet corresponds to, and the fourth value is related to a quantity of data packets that the second packet corresponds to.

In an implementation, the second value is a sum of the first value, an opposite number of a first sum, and a second sum, where the first sum is a sum of third values corresponding to all first packets in the plurality of packets, and the second sum is a sum of fourth values corresponding to all second packets in the plurality of packets.

In an implementation, in terms of adjusting the congestion window based on the plurality of packets, the controlling module is configured to decrease the value of the congestion window by the third value based on the one first packet in the plurality of packets, and increase the value of the congestion window by the fourth value based on the one second packet in the plurality of packets.

In an implementation, in terms of adjusting the congestion window based on the plurality of packets, the controlling module is configured to calculate the second value based on a quantity of the first packets, an amount by which the value of the congestion window is enabled to be decreased by each of the first packets, a quantity of the second packets, and an amount by which the value of the congestion window is enabled to be increased by each of the second packets, and adjust the value of the congestion window from the first value to the second value.

In an implementation, the sending module is further configured to send the plurality of data packets whose quantity is the second value to the receive end over the connection.

In a possible implementation, the fourth value is further related to the first value and an increase factor. The increase factor may be a preset value.

The congestion control apparatus in any one of the second aspect and the possible implementations of the second aspect can also achieve same technical effects as the congestion control method in the foregoing technical solution.

According to a third aspect, this application provides a device, including a storage medium, a processing circuit, and a communications interface. The storage medium is configured to store an executable program. The processing circuit is configured to read the executable program stored in the storage medium, and collaborate with the communications interface to perform the congestion control method in the foregoing technical solution. The processing circuit may invoke the communications interface to send a data packet, receive a packet, and the like. The processing circuit may implement the step of adjusting a congestion window. The device provided in this application can achieve same technical effects as the congestion control method in the foregoing technical solution.

According to a fourth aspect, this application provides a storage medium. The storage medium stores a program. When the program is executed by the processing circuit, the congestion control method in the foregoing technical solution is implemented, and same technical effects can be achieved as technical effects achieved in the congestion control method in the foregoing technical solution.

DESCRIPTION OF EMBODIMENTS

This application provides a congestion control method and apparatus, a device, and a storage medium, and is applicable to a Transmission Control Protocol (TCP)/User Datagram Protocol (UDP) layer and an Internet Protocol (IP) layer in a communications protocol stack, and remote direct memory access (RDMA) over Converged Ethernet (RoCE) between an Ethernet switch and a host channel adapter (HCA). For example, a typical application scenario of the technical solution of this application is an RDMA network. In an example, the congestion control method in this application is applicable to a scenario of RDMA data access. For example, a user terminal directly writes data into a memory of a remote server, and no kernel intervention or memory copy occurs in the data writing process. A delay for data processing on the remote server side can be reduced through RDMA. In Ethernet, the user terminal first sends data in a form of a data packet to a switching node, and then the switching node sends the data packet to the remote server. In a process of storing data to the remote server, the data is quickly moved to a memory of the remote server, and a central processing unit of the remote server is not required in the data exchange process, thereby reducing overheads of the central processing unit of the remote server in a data transmission process. The congestion control method in this application can be used for data transmission between the user terminal and the switching node.

Figure 1:
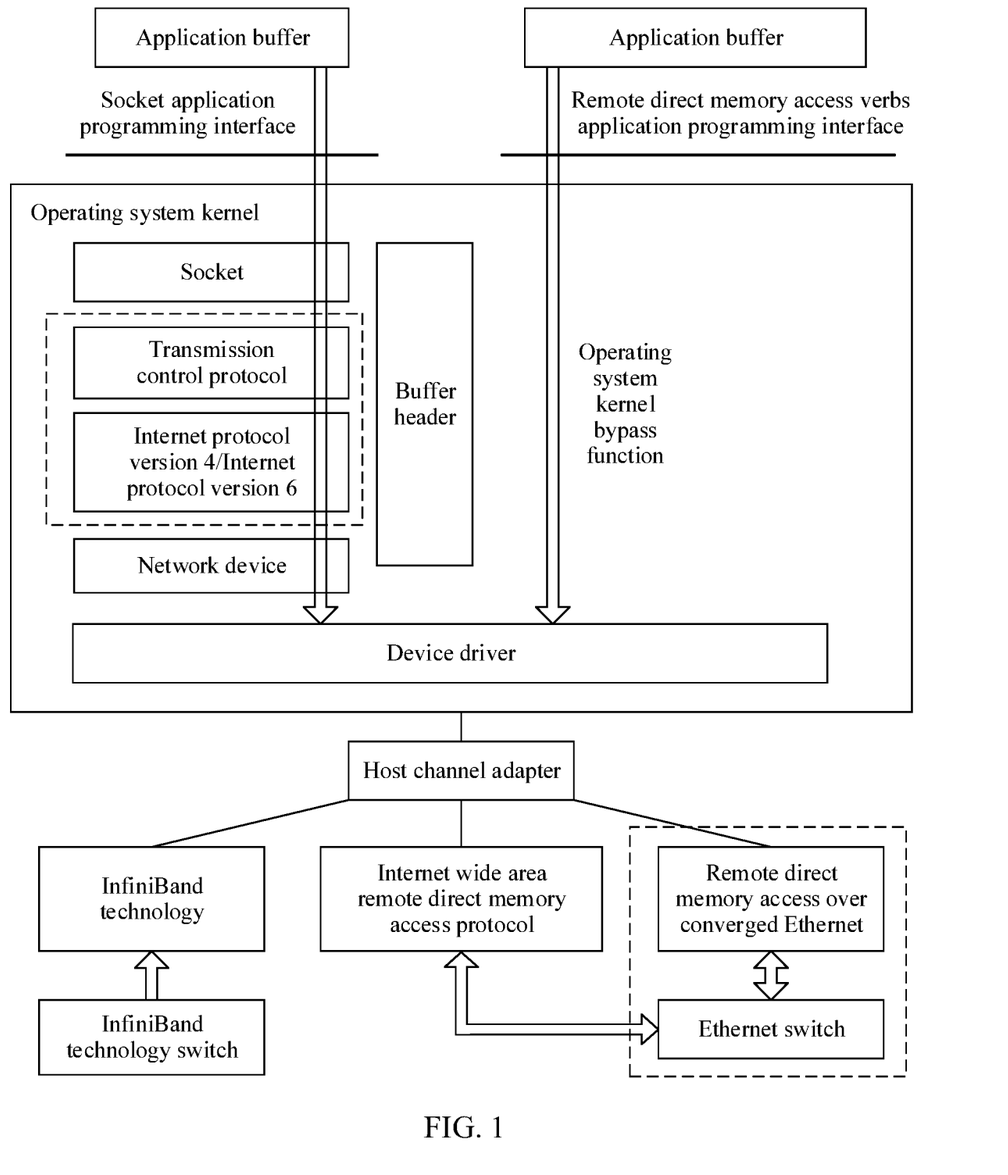
FIG. 1 is a diagram of a network application scenario according to an embodiment of this application.

FIG. 1 is a diagram of a network application scenario according to an embodiment of this application. As shown in FIG. 1, an application buffer is user buffer space in an application program. Data may enter an operating system kernel from the application buffer through a socket application programming interface (API) of a user, and arrive at a device driver in the operating system kernel through a socket, a TCP, an IP version 4 (IPv4)/IP version 6 (IPv6), and a network device in the operating system kernel. In addition, data may alternatively enter the operating system kernel through an RDMA Verbs API, and arrive at the device driver in the operating system kernel based on an operating system kernel bypass function, thereby implementing RDMA. A buffer header in the operating system kernel may store an actual memory address of data, a data type, a linked list to which the buffer header belongs, a data status, a data mark, and the like. This is not limited herein. The operating system kernel may exchange data with an INFINIBAND switch using an INFINIBAND technology through a HCA installed on a server. The operating system kernel may also exchange data with an Ethernet switch through the HCA using a technology such as an Internet Wide Area RDMA Protocol (iWARP) protocol or an RoCE technology.

Data flowing in the congestion control method in the embodiments of this application relates to parts represented by dashed lines in FIG. 1, that is, the data flowing relates to data flowing between the internet protocol and the transmission control protocol and data flowing between a switching node and a transmit end. It should be understood that the technical solution of this application relates to a scenario of interaction between three parties: the transmit end, the switching node, and a receive end. However, in an implementation, technical improvements of this application are made on the transmit end, and the switching node and the receive end may still collaborate in a some other approaches manner. The switching node may be a router, a switch, or the like. The transmit end may be a server, a terminal, a cloud platform, or even a network device such as an intelligent network interface card. For example, in the congestion control method in the embodiments of this application, a congestion echo flag obtained based on the transmission control protocol may be marked based on a congestion flag marked based on an internet protocol such as the internet protocol version 4/internet protocol version 6. A value of a congestion window maintained by the transmit end is adjusted based on a packet using the congestion control method in the embodiments of this application. For another example, the congestion control method in the embodiments of this application is used to adjust the value of the congestion window of the transmit end in the RoCE process between the server (the transmit end) and the Ethernet switch (the switching node).

The congestion control method in the embodiments of this application is mainly applied to the transmit end over the connection. The connection includes the transmit end, the switching node, and the receive end. The transmit end may send a data packet to the switching node, and the data packet enters a queue in the switching node. The switching node may be configured to set (that is, mark) a congestion flag for the data packet. The switching node sequentially sends data packets to the receive end based on a sequence of the data packets in the queue. The receive end sends a packet to the transmit end based on a received data packet. The transmit end adjusts the value of the congestion window based on the packet.

Figure 2:
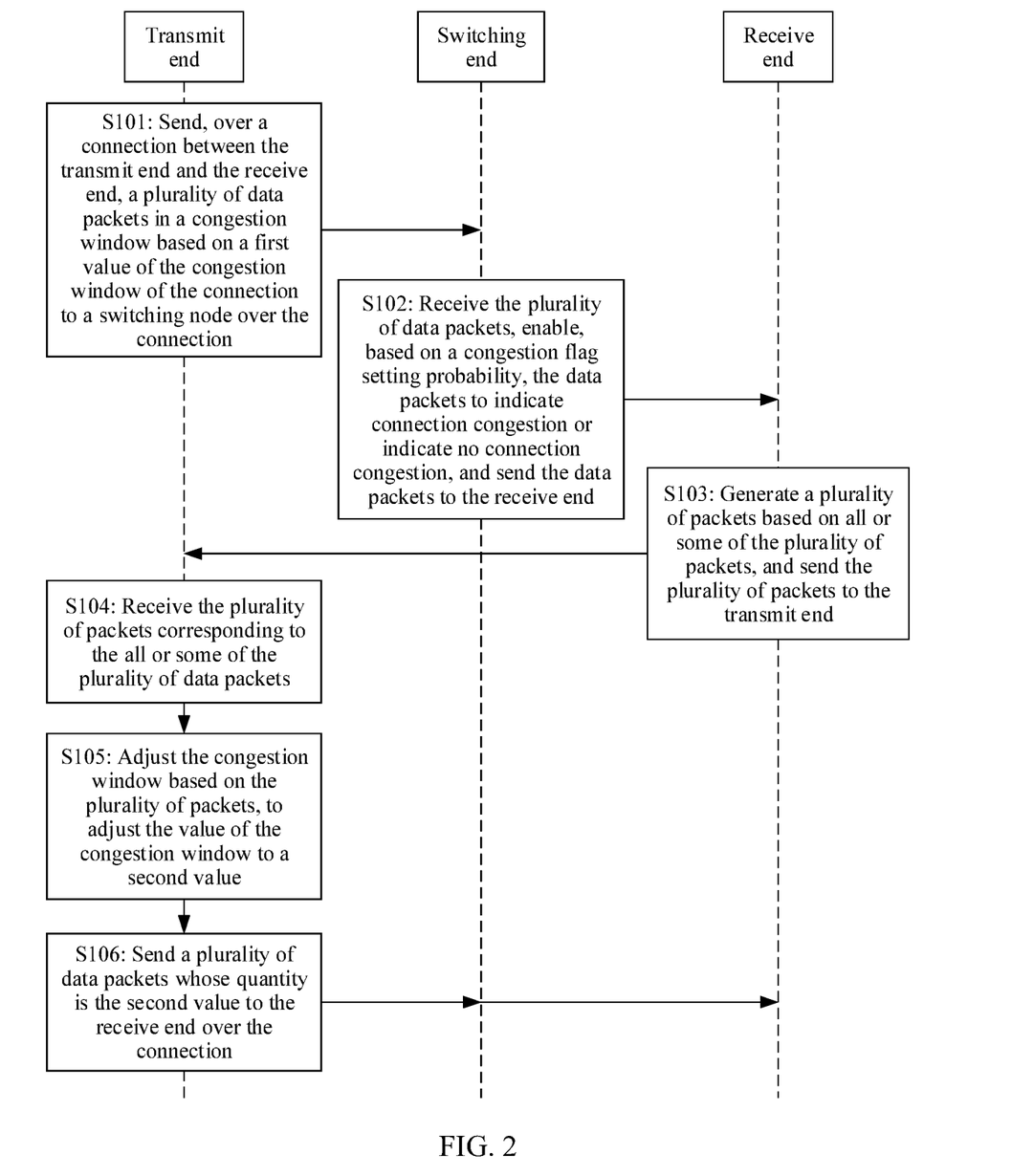
FIG. 2 is a flowchart of a congestion control method according to an embodiment of this application.

FIG. 2 is a flowchart of a congestion control method according to an embodiment of this application. As shown in FIG. 2, the congestion control method includes step S101 to step S106. For ease of understanding, a procedure of interaction between a transmit end, a switching end, and a receive end is used for description.

Step S101: The transmit end sends, over a connection between the transmit end and the receive end, a plurality of data packets to a switching node in a congestion window.

A quantity of the plurality of data packets sent by the transmit end is a first value, and the first value is a value of the congestion window of the connection. The connection is in a congestion avoidance state. Further, the transmit end sends the plurality of data packets to the receive end through the switching node. That is, the transmit end sends the plurality of data packets to the switching node, and then the switching node sends the plurality of data packets to the receive end.

Step S102: The switching node receives the plurality of data packets, enables, based on a congestion flag setting probability, the data packets to indicate connection congestion or indicate no connection congestion, and send the data packets to the receive end.

That the data packet indicates connection congestion means that congestion occurs when one or more of the plurality of data packets are transmitted over the connection. That the data packet indicates no connection congestion means that congestion does not occur when one or more of the plurality of data packets are transmitted over the connection.

In an example, a congestion flag may be set for a data packet, and the data packet that carries the congestion flag indicates connection congestion. The congestion flag is marked at a third layer of a network, that is, an IP layer. That is, the congestion flag is marked in an IP header of the data packet. The congestion flag indicates that congestion occurs in the network. For example, the congestion flag may be congestion experienced (CE). For example, the CE is 11 that is set in a header of an IP data packet. A data packet that does not carry a congestion flag indicates that congestion does not occur over the connection. It should be noted that a queue depth of the switching node is within a normal range of a queue depth, and the congestion flag setting probability is positively correlated with the queue depth. The queue depth of the switching node is a quantity of to-be-sent data packets. In an example, the normal range of the queue depth is related to one or more of the following parameters: a bandwidth-delay product, a maximum value of the normal range of the queue depth, a minimum value of the normal range of the queue depth, an increase factor, a maximum congestion flag setting probability, a third value corresponding to a first packet, and a fifth value corresponding to a second packet received by the transmit end in a Slow Start state. The Slow Start state is a state in a period of time when the connection is initially established. The slow start state starts when the connection is initially established, and ends when the transmit end receives the first packet for the first time. Related descriptions of the first packet and the second packet are described in detail below.

Figure 3:
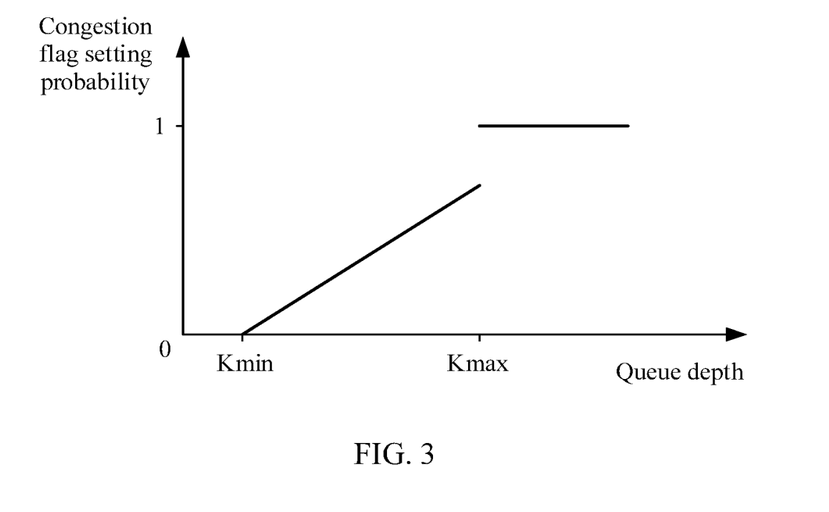
FIG. 3 is a schematic diagram of a positive correlation between a congestion flag setting probability and a queue depth according to an embodiment of this application.

When the queue depth of the switching node is within the normal range of the queue depth, the congestion flag setting probability may be linearly positively correlated with the queue depth or nonlinearly positively correlated with the queue depth. For example, FIG. 3 is a schematic diagram of a positive correlation between the congestion flag setting probability and the queue depth according to this embodiment of this application. As shown in FIG. 3, a horizontal axis represents the queue depth, and a vertical axis represents the congestion flag setting probability. The minimum value of the normal range of the queue depth is Kmin, and the maximum value of the normal range of the queue depth is Kmax. If the queue depth is greater than or equal to Kmin and less than or equal to Kmax, the congestion flag setting probability is linearly positively correlated with the queue depth. If the queue depth is less than Kmin, the congestion flag setting probability is 0. If the queue depth is greater than Kmax, the congestion flag setting probability is 100%.

Step S103: The receive end generates a plurality of packets based on all or a portion of the plurality of packets, and sends the plurality of packets to the transmit end.

In an example, the receive end may use all of the plurality of received data packets as a basis for generating a packet. For example, the transmit end sends 100 data packets to the receive end. In the 100 data packets, 20 data packets indicate connection congestion, and 80 data packets indicate no connection congestion. In this case, the receive end may generate a plurality of packets based on the 100 data packets, and send the plurality of packets to the transmit end.

In another example, the receive end may alternatively use a portion of the plurality of received data packets as a basis for generating a packet. For example, the transmit end sends 100 data packets to the receive end. In the 100 data packets, 20 data packets indicate connection congestion, and 80 data packets indicate no connection congestion. The receive end may select 60 data packets from the 100 data packets in a random manner or according to a rule. The receive end generates a plurality of packets based on the selected 60 data packets, and sends the plurality of packets to the transmit end.

The plurality of packets includes one or more first packets and one or more second packets. The first packet is used to indicate that congestion occurs over the connection when one or more of the plurality of data packets are transmitted. The second packet is used to indicate that no congestion occurs over the connection when one or more of the plurality of data packets are transmitted.

In an example, the first packet may be a dedicated packet used to indicate network congestion, for example, a dedicated CNP. The second packet may be an ACK of a data packet.

In another example, the plurality of packets may be ACK packets. Each ACK packet may be further used to indicate that a specific quantity of data packets in the plurality of data packets arrive at the receive end. The specific quantity is one or more. That is, each ACK packet may correspond to one or more data packets. When the plurality of packets are ACK packets, the first packet carries a congestion echo flag, and the congestion echo flag is used to indicate that congestion occurs over the connection when one or more of the plurality of data packets are transmitted. For example, the congestion echo flag may be a label marked in the ACK based on an ECE technology. Further, the congestion echo flag may be marked in a packet based on the congestion flag, and a packet marked with the congestion echo flag is the first packet. Further, after the receive end receives the data packet sent by the switching node, if an IP packet header of the data packet is marked with the congestion flag, the receive end may mark the congestion echo flag at a fourth layer of the network, that is, a TCP layer, and may mark the congestion echo flag in a TCP packet header. The congestion echo flag of the first packet may be an ECE. For example, the ECE is 1 that is set in a header of a TCP data packet. The second packet does not carry the congestion echo flag, that is, the second packet generated by the receive end does not mark with a congestion echo flag.

Step S104: The transmit end receives the plurality of packets corresponding to the all or a portion of the plurality of data packets.

Step S105: The transmit end adjusts the congestion window based on the plurality of packets, to adjust the value of the congestion window to a second value.

The transmit end receives the plurality of packets, and may parse the plurality of packets, to determine the first packet and the second packet in the plurality of packets. For example, if the packet is an ACK packet, after the transmit end receives the ACK packet, the transmit end parses the ACK packet. If the transmit end obtains a congestion echo flag by parsing the ACK packet, the transmit end determines that the packet is the first packet. If the transmit end does not obtain a congestion echo flag by parsing the ACK packet, the transmit end determines that the packet is the second packet.

The first packet enables the value of the congestion window to decrease, and the second packet enables the value of the congestion window to increase. For example, one first packet in the plurality of packets enables the value of the congestion window to decrease by the third value. One second packet in the plurality of packets enables the value of the congestion window to increase by a fourth value. The third value is related to a quantity of data packets that is indicated by one first packet. The fourth value is related to a quantity of data packets that is indicated by one second packet. In an example, the third value is positively correlated to the quantity of data packets that is indicated by one first packet, and the fourth value is positively correlated to the quantity of data packets that is indicated by one second packet.

For example, third values corresponding to first packets corresponding to N data packets are N times a third value corresponding to a first packet corresponding to one data packet. Fourth values corresponding to second packets corresponding to N data packets are N times a fourth value corresponding to a second packet corresponding to one data packet. N is a positive integer.

In an example, the receive end sets that the first packet and the second packet each corresponds to a fixed quantity of data packets, and the fixed quantity is one or more. In this case, third values corresponding to all first packets are the same. Fourth values corresponding to all second packets are the same. For example, each first packet corresponds to two data packets indicating connection congestion, and an amount by which the value of the congestion window is enabled to be decreased by one first packet corresponding to a data packet indicating connection congestion is $\beta$. Therefore, a third value corresponding to each first packet is $2\beta$. Each second packet corresponds to two data packets indicating no connection congestion, and an amount by which the value of the congestion window is enabled to be increased by one second packet corresponding to a data packet indicating connection congestion is $\theta$. Therefore, a fourth value corresponding to each second packet is $2\theta$. It should be noted that the quantity of data packets corresponding to the first packet may be the same as or different from the quantity of data packets corresponding to the second packet. This is not limited herein.

In another example, the receive end may not limit the quantity of data packets corresponding to the first packet and the quantity of data packets corresponding to the second packet. For example, the transmit end receives two first packets and two second packets over the connection in the congestion avoidance state. A $1^{st}$ first packet corresponds to one data packet, and a $2^{nd}$ first packet corresponds to two data packets. The value of the congestion window of one first packet corresponding to a data packet indicating connection congestion may be decreased by $\beta$. Therefore, a third value corresponding to the $1^4$ first packet is $\beta$, and a third value corresponding to the $2^{nd}$ first packet is $2\beta$. A $1^4$ second packet corresponds to two data packets, and a $2^{nd}$ second packet corresponds to one data packet. An amount by which the value of the congestion window is enabled to be increased by one second packet corresponding to a data packet indicating no connection congestion is $\theta$. Therefore, a fourth value corresponding to the $1^{st}$ second packet is $2\theta$, and a fourth value corresponding to the $2^{nd}$ second packet is $\theta$.

Each packet may correspond to one or more data packets. Quantities of data packets corresponding to all packets may be the same. A quantity of data packets corresponding to a packet may be preset between the receive end and the transmit end. For example, it is preset that each packet corresponds to one data packet. For another example, it is preset that each packet corresponds to two data packets. Quantities of data packets corresponding to all packets may be alternatively different. A data packet quantity field may be set in an idle byte of a packet. Information about the data packet quantity field is read by parsing the packet, to determine a quantity of data packets corresponding to the packet. It should be noted that the first packet may be a special packet dedicated to indicating that congestion occurs when one or more of the plurality of data packets are transmitted over the connection. The special packet may correspond to one data packet used to indicate connection congestion, or may correspond to a plurality of data packets dedicated to indicating connection congestion. For setting of a quantity of data packets, corresponding to the special packet, dedicated to indicating connection congestion, refer to setting of a quantity of data packets corresponding to an ordinary packet.

One packet is generated for each data packet such that a transmit rate of the transmit end can be controlled at a fine granularity, thereby improving precision of congestion control. However, in consideration of calculation costs such as resource occupation of congestion control, it may be appropriately set that two or more data packets are generated for one packet, to achieve a balance between calculation costs and congestion control precision.

In an example, in a process of adjusting the congestion window, each time when the transmit end receives a packet, the transmit end may adjust the congestion window in real time based on the packet. If one of the plurality of packets received by the transmit end is a first packet, the transmit end decreases, based on the one received first packet, the value of the congestion window by a third value corresponding to the first packet. If one of the plurality of packets received from the receive end is a second packet, the transmit end increases, based on the one received second packet, the value of the congestion window by a fourth value corresponding to the second packet.

It should be noted that, in the foregoing descriptions, the amount by which the value of the congestion window is enabled to be decreased by the first packet corresponding to one data packet indicating connection congestion (that is, the third value corresponding to the first packet corresponding to one data packet) and the amount by which the value of the congestion window is enabled to be increased by the second packet corresponding to one data packet indicating no connection congestion (that is, the fourth value corresponding to the second packet corresponding to one data packet) may be preset based on a specific working scenario and a working requirement. In an example, the fourth value is further related to the first value and an increase factor. For example, the fourth value corresponding to the second packet corresponding to one data packet is a quotient between the increase factor and the first value. It is assumed that the fourth value corresponding to the second packet corresponding to one data packet is θ, the increase factor is γ, and the first value is Cwnd1. The increase factor may also be set based on a specific working scenario and a working requirement. A relationship between the foregoing parameters is shown in formula (1):

$$\theta = \gamma/\text{Cwnd1}. \tag{1}$$

In a specific operation, the transmit end may calculate the second value based on a quantity of the first packets, an amount by which the value of the congestion window is enabled to be decreased by each of the first packets, a quantity of the second packets, and an amount by which the value of the congestion window is enabled to be increased by each of the second packets. The transmit end obtains the second value, and adjusts the value of the congestion window from the first value to the second value. A total amount by which the value of the congestion window is enabled to be decreased by all the first packets may be obtained based on the quantity of the first packets and the amount by which the value of the congestion window is enabled to be decreased by each of the first packets. A total amount by which the value of the congestion window is enabled to be increased by all the second packets may be obtained based on the quantity of the second packets and the amount by which the value of the congestion window is enabled to be increased by each of the second packets. The second value may be obtained based on the total amount by which the value of the congestion window is enabled to be decreased by all the first packets, the total amount by which the value of the congestion window is enabled to be increased by all the second packets, and the value of the congestion window.

That is, the foregoing second value is a value, of the congestion window, obtained through a plurality of adjustment performed based on all the packets that are received by the transmit end in the congestion window. For example, the second value is a sum of the first value, an opposite number of a first sum, and a second sum. The first sum is a sum of third values corresponding to all the first packets in the plurality of packets. The second sum is a sum of fourth values corresponding to all the second packets in the plurality of packets. For example, the transmit end receives one first packet and two second packets in the congestion window over the connection in the congestion avoidance state. It is assumed that the first value is Cwnd1, the second value is Cwnd2, the third value corresponding to the first packet is $\beta_1$, a fourth value corresponding to the $1^{st}$ second packet is $\theta_1$, and a fourth value corresponding to the $2^{rd}$ second packet is $\theta_2$. Formula (2) may be obtained as follows:

$$\text{Cwnd2} = \text{Cwnd1} - \beta_1 + \theta_1 + \theta_2. \tag{2}$$

In the congestion control method in this embodiment of this application, the receive end generates, based on the congestion flag of the data packet in the congestion window, the first packet indicating that congestion occurs when one or more of the plurality of data packets are transmitted over the connection, and the second packet indicating that no congestion occurs when one or more of the plurality of data packets are transmitted over the connection. The transmit end proportionally decreases and increases the value of the congestion window based on the first packet and the second packet in the plurality of packets, to adjust the value of the congestion window at a finer granularity. In this embodiment of this application, there is a Lyapunov balance point in the adjustment of the congestion window. During continuous adjustment of the value of the congestion window, the queue depth of the switching node is controlled to reach a comparatively shallow and stable queue depth.

For example, assuming that the fourth value corresponding to the second packet corresponding to one data packet is shown in formula (1), the congestion flag setting probability is p, and a value of the congestion window at a moment t is Cwnd(t), a value Cwnd(t+Rtt) of the congestion window at a moment (t+a round-trip time (Rtt)) is calculated as follows according to formula (3):

$$\text{Cwnd}(t+\text{Rtt}) = \text{Cwnd}(t) + \gamma \times (1-p) - \beta \times \text{Cwnd}(t) \times p. \tag{3}$$

γ represents the foregoing increase factor, and β represents the fourth value corresponding to the second packet corresponding to one data packet.

Formula (4) may be obtained as follows according to formula (3):

$$(d\text{Cwnd}/dt) = (1/\text{RTT}) \times [(\gamma/\text{Cwnd}) \times (1-p) - \beta \times \text{Cwnd}(t) \times p]. \tag{3}$$

If $\Sigma(d\text{Cwnd}/dt) = 0$, $\Sigma\text{Cwnd} = (n\gamma/\beta)[(1/p)-1]$, where n represents a quantity of network connection flows. When ΣCwnd is equal to the bandwidth-delay product (BDP), the Lyapunov balance point is reached, and a comparatively small and stable queue depth Q may be calculated as follows:

$$Q = (K \times n\gamma)/[(\text{BDP} \times \beta) + n\gamma]. \tag{5}$$

K represents a difference between the maximum value of the queue depth and the minimum value of the queue depth.

When the Lyapunov equilibrium point is reached, the queue depth of the switching node remains at the comparatively shallow and stable queue depth Q. In the other approaches, the queue depth of the switching node greatly fluctuates, and the queue depth is excessively large, where the queue depth may range from 100 to 256. As a queue buffer in the switching node is limited, and the large queue depth strains the queue buffer in the switching node. Consequently, a delay in a data transmission process is increased, and a packet loss rate is increased. According to the congestion control method in this embodiment of this application, in the process of continuously adjusting the congestion window, the transmit end proportionally decreases and increases the value of the congestion window based on the first packet and the second packet. In this way, the value of the congestion window can be stably maintained at a comparatively shallow and stable queue depth. For example, the stable queue depth in this embodiment of this application may range from 10 to 20. The stable queue depth is comparatively shallow such that a sufficient queue buffer is reserved for the switching node. In this way, the delay in the data transmission process is reduced, and the packet loss rate is more controllable such that impact made by unexpected factors on network performance such as the packet loss can be mitigated, data transmission is more stable, and transmission quality is reliable. In addition, according to the congestion control method in this embodiment of this application, the congestion window can be controlled more precisely when a complex mechanism such as priority-based flow control (PFC) is not enabled, thereby improving network stability. This can avoid deadlock, and further ensure network stability, and improve network service quality.

In addition, in this embodiment of this application, when the stable queue depth is not 0, that is, when it is ensured that there is always a data packet in the queue, comparatively high network bandwidth utilization can also be ensured. This can achieve a balance between a low delay and high network bandwidth utilization in a data transmission process.

For example, a comparison between effects achieved using a TCP algorithm, a DCQCN algorithm, and an algorithm of the solution in this application in a same network condition is shown in Table 1.

TABLE 1

|  | Utilized bandwidth | Queue depth |
|---|---|---|
| TCP algorithm | 13.8 gigabits per second (Gbps) | 0 to 256 |
| DCQCN algorithm | 25.2 Gbps | 0 to 100 |
| Algorithm of the solution in this application | 35.9 Gbps | 0 to 20 |

It can be learned that the bandwidth used in the algorithm of the solution in this application is higher than the bandwidth of the TCP algorithm and the DCQCN algorithm, the queue depth in the algorithm of the solution in this application is less than the queue depth of the TCP algorithm and the DCQCN algorithm, and the queue depth is effectively controlled within a comparatively small change, and this can ensure an excessively low packet loss rate. In addition, the queue depth is kept at a stable queue depth value, thereby further improving network bandwidth utilization.

Step S106: The transmit end sends the plurality of data packets whose quantity is the second value to the receive end over the connection.

After the value of the congestion window is adjusted, when the transmit end sends a data packet in a next congestion window, the transmit end sends, to the switching node, data packets whose quantity is an adjusted second value, to adjust the queue depth of the switching node.

In another embodiment, the foregoing connection may be alternatively in a slow start state. Before step S101, that is, before the connection of the transmit end is in the congestion avoidance state, the connection of the transmit end is in the slow start state. The slow start state starts when the connection is initially established, and ends when the transmit end receives the first packet indicating connection congestion for the first time. In the slow start state, the transmit end may send, based on a sixth value of the congestion window of the connection in the slow start state, a plurality of data packets to the receive end over the connection in the slow start state. A quantity of the plurality of data packets over the connection in the slow start state is the sixth value.

Further, the transmit end sends the data packets to the receive end through the switching node. To be specific, the transmit end first sends the data packets to the switching node, and the switching node enables, based on the congestion flag setting probability, the data packets to indicate connection congestion or indicate no connection congestion, and sends the data packets to the receive end. The receive end generates a slow start packet based on the data packets. The slow start packet is a packet corresponding to the plurality of data packets over the connection in the slow start state. The slow start packet includes one first packet and an integer quantity of second packets. The receive end sends the first packet and the second packet to the transmit end. The transmit end adjusts the congestion window based on each packet in the slow start packet over the connection in the slow start state, to adjust the value of the congestion window to the first value.

A function of each packet in the slow start packet is basically the same as a function of the packet over the connection in the congestion avoidance state. It should be noted that, over the connection in the slow start state, each first packet enables the congestion window to decrease by the third value. Each second packet enables the value of the congestion window to increase by a fifth value.

After the slow start state ends, the connection may switch to the congestion avoidance state. The connection in the congestion avoidance state starts after the transmit end receives, for the first time, the first packet that carries the congestion echo flag. The value of the congestion window is continuously adjusted over the connection in the slow start state, and a value of the congestion window when the slow start state ends is a value of the congestion window when the connection starts to be in the congestion avoidance state.

For ease of understanding, the following uses an example to describe an algorithm for adjusting the value of the congestion window in the congestion control method in an entire process from the slow start state to the congestion avoidance state.

It is assumed that a third value corresponding to a first packet corresponding to one data packet over a connection in the slow start state is $\beta$, a fifth value corresponding to a second packet corresponding to the data packet over the connection in the slow start state is $\alpha$, the third value corresponding to the first packet corresponding to one data packet over the connection in the congestion avoidance state is $\beta$, and a fourth value corresponding to the second packet corresponding to the data packet over the connection in the congestion avoidance state is $\theta$. It is assumed that $\theta$ is shown in formula (1). It is assumed that the transmit end receives 10 packets in a congestion window. Each packet corresponds to one packet. The 10 packets are sequentially as follows: a second packet, a second packet, a first packet, a second packet, a first packet, a first packet, a second packet, a second packet, a first packet, and a second packet.

In this case, the first two second packets and the $1^{st}$ first packet are packets over the connection in the slow start state, and the remaining first packets and the remaining second packets are packets over the connection in the congestion avoidance state. Assuming that the sixth value is Cwnd3, the first value Cwnd1 may be calculated as follows according to formula (6):

$$Cwnd1=Cwnd3\alpha+\alpha-\beta=Cwnd3-2\times\alpha-\beta. \quad (6)$$

The second value Cwnd2 may be calculated as follows according to formula (7):

$$Cwnd2=Cwnd1+(\gamma/Cwnd1)-\beta-\beta+(\gamma/Cwnd1)+(\gamma/Cwnd1)-\beta+(\gamma/Cwnd1)=Cwnd3-2\times\alpha-4\times\beta+4\times(\gamma/Cwnd1). \quad (7)$$

After the congestion window is adjusted continuously, a value of a next congestion window, that is, the second value Cwnd2 is equal to Cwnd3−2×α−4×β+4×(γ/Cwnd1).

It should be understood that the foregoing parameters α, β, and γ may be first determined based on information such as a network topology and a network parameter before data transmission, for example, the foregoing parameters α, β, and γ may be determined during networking or connection establishment in the foregoing example calculation manner or another calculation manner, and then the foregoing parameters α, β, and γ are configured as system parameters such that the foregoing parameters α, γ, and γ are be directly used in the data transmission process over the connection (for example, in the foregoing process starting from S101 or in a period after the connection is in the slow start state). For another example, an expected stable queue depth Q may be preset, α, β, and γ based on which the expected stable queue depth Q can be reached are set, and α, β, and γ are configured as system parameters.

The following uses an example to describe a process of the congestion control method in the embodiments of this application. A value of a congestion window initially sent by the transmit end is set to 100. That is, a size of the congestion window is 100 data packets initially sent by the transmit end. The minimum value Kmin of the queue depth is 0, and the maximum value Kmax of the queue depth is 40. An initial queue depth is 20. An initial congestion flag setting probability is 10%. The third value β corresponding to the first packet corresponding to one data packet is 0.5, and the increase factor γ is 1.0. In a normal range of a queue depth, a curve formula of the congestion flag setting probability is y=0.005x, where y represents the congestion flag setting probability, and x represents the queue depth. It is assumed that each data packet corresponds to one packet.

The first adjustment for the value of the congestion window, where the transmit end sends the 100 data packets to the switching node based on the initial value 100 of the congestion window. The switching node sets, based on the initial congestion flag setting probability 10%, a data packet used to indicate connection congestion and a data packet used to indicate no connection congestion. In this case, the 100 data packets include 90 data packets used to indicate no connection congestion and 10 data packets used to indicate connection congestion. The receive end receives the 90 data packets indicating no connection congestion and the 10 data packets indicating connection congestion, and generates 90 packets indicating that no congestion occurs over the connection when one or more of a plurality of data packets are transmitted and 10 packets indicating that congestion occurs over the connection when one or more of a plurality of data packets are transmitted. The transmit end receives, from the receive end, the 90 packets indicating that no congestion occurs over the connection when the one or more of the plurality of data packets are transmitted and the 10 packets indicating that congestion occurs over the connection when the one or more of the plurality of data packets are transmitted, and adjusts the value of the congestion window for the first time. A value, of the congestion window, obtained through the adjustment is $100+1.0\times(90/100)-0.5\times10\approx96$. For a specific method for calculating the value, obtained through the adjustment, of the congestion window, refer to formula (3).

The second adjustment for the value of the congestion window, where the transmit end sends 96 data packets to the switching node based on the value 96, of the congestion window, obtained through the first adjustment. Because the value of the congestion window decreases, the queue depth accordingly decreases. A required congestion flag setting probability for calculating a value, of the congestion window, obtained through the second adjustment, is: $[20-(100-96)]\times0.05=8\%$. The switching node sets, based on the congestion flag setting probability 8%, a data packet used to indicate connection congestion and a data packet used to indicate no connection congestion. In this case, the 96 data packets include 88 data packets indicating no connection congestion and 8 data packets indicating connection congestion. The receive end receives the 88 data packets indicating no connection congestion and the 8 data packets indicating connection congestion, and generates 88 packets indicating that no congestion occurs over the connection when the one or more of the plurality of data packets are transmitted and 8 packets indicating that congestion occurs over the connection when the one or more of the plurality of data packets are transmitted. The transmit end receives, from the receive end, the 88 packets indicating that no congestion occurs over the connection when the one or more of the plurality of data packets are transmitted and the 8 packets indicating that congestion occurs over the connection when the one or more of the plurality of data packets are transmitted, and adjusts the value of the congestion window for the second time. A value, of the congestion window, obtained through the adjustment is: $96+1.0\times(88/96)-0.5\times8\approx93$.

The third adjustment for the value of the congestion window, where the transmit end sends 93 data packets to the switching node based on the value 93, of the congestion window, obtained through the second adjustment. Because the value of the congestion window decreases, the queue depth accordingly decreases. A required congestion flag setting probability for calculating the value, of the congestion window, obtained through a third adjustment is: $[20-(100-93)]\times0.05=6.5\%$. The switching node sets, based on the congestion flag setting probability 6.5%, a data packet used to indicate connection congestion and a data packet used to indicate no connection congestion. In this case, the 93 data packets include 87 data packets indicating no connection congestion and 6 data packets indicating connection congestion. The receive end receives the 87 data packets indicating no connection congestion and the 6 data packets indicating connection congestion, and generates 87 packets indicating that no congestion occurs over the connection when the one or more of the plurality of data packets are transmitted and 6 packets indicating that congestion occurs over the connection when the one or more of the plurality of data packets are transmitted. The transmit end receives, from the receive end, the 87 packets indicating that no congestion occurs over the connection when the one or more of the plurality of data packets are transmitted and the 6 packets indicating that congestion occurs over the connection when the one or more of the plurality of data packets are transmitted, and adjusts the value of the congestion window for the third time. A value, of the congestion window, obtained through the adjustment is: $93+1.0\times(87/93)-0.5\times6\approx91$.

The following adjustment is deduced by analogy, until the value of the congestion window is adjusted for the eighth time.

The eighth adjustment for the value of the congestion window, where the transmit end sends 86 data packets to the switching node based on a value 86, of the congestion window, obtained through the seventh adjustment. Because the value of the congestion window decreases, the queue depth accordingly decreases. A required congestion flag setting probability for calculating the value, of the congestion window, obtained through an eighth adjustment is: $[20-(100-86)]\times0.05=3\%$. The switching node sets, based on the congestion flag setting probability 3%, a data packet used to indicate connection congestion and a data packet used to indicate no connection congestion. In this case, the 86 data packets include 83 data packets indicating no connection congestion and 3 data packets indicating connection congestion. The receive end receives the 83 data packets indicating no connection congestion and the 3 data packets indicating connection congestion, and generates 83 packets indicating that no congestion occurs over the connection when the one or more of the plurality of data packets are transmitted and 3 packets indicating that congestion occurs over the connection when the one or more of the plurality of data packets are transmitted. The transmit end receives, from the receive end, the 83 packets indicating that no congestion occurs over the connection when the one or more of the plurality of data packets are transmitted and the 3 packets indicating that congestion occurs over the connection when the one or more of the plurality of data packets are transmitted, and adjusts the value of the congestion window for the eighth time. A value, of the congestion window, obtained through the adjustment is: 86+1.0×(83/86)−0.5×3≈85.

The ninth adjustment for the value of the congestion window, where the transmit end sends 85 data packets to the switching node based on the value 85, of the congestion window, obtained through the eighth adjustment. Because the value of the congestion window decreases, the queue depth accordingly decreases. A required congestion flag setting probability for calculating the value, of the congestion window, obtained through the ninth adjustment is: [20−(100−85)]×0.05=2.5%. The switching node sets, based on the congestion flag setting probability 2.5%, a data packet used to indicate connection congestion and a data packet used to indicate no connection congestion. In this case, the 85 data packets include 83 data packets indicating no connection congestion and 2 data packets indicating connection congestion. The receive end receives the 83 data packets indicating no connection congestion and the 2 data packets indicating connection congestion, and generates 83 packets indicating that no congestion occurs over the connection when the one or more of the plurality of data packets are transmitted and 2 packets indicating that congestion occurs over the connection when the one or more of the plurality of data packets are transmitted. The transmit end receives, from the receive end, the 83 packets indicating that no congestion occurs over the connection when the one or more of the plurality of data packets are transmitted and the 2 packets indicating that congestion occurs over the connection when the one or more of the plurality of data packets are transmitted, and adjusts the value of the congestion window for the ninth time. A value, of the congestion window, obtained through the adjustment is: 85+1.0×(83/85)−0.5×2≈85.

The following adjustment for the value of the congestion window is deduced by analogy, and the queue depth is stably kept at 5 without great fluctuation. This ensures a comparatively small and stable queue depth such that a sufficient queue buffer is reserved for the switching node, a delay is reduced in the data transmission process, and a data packet rate is reduced.

Figure 4:
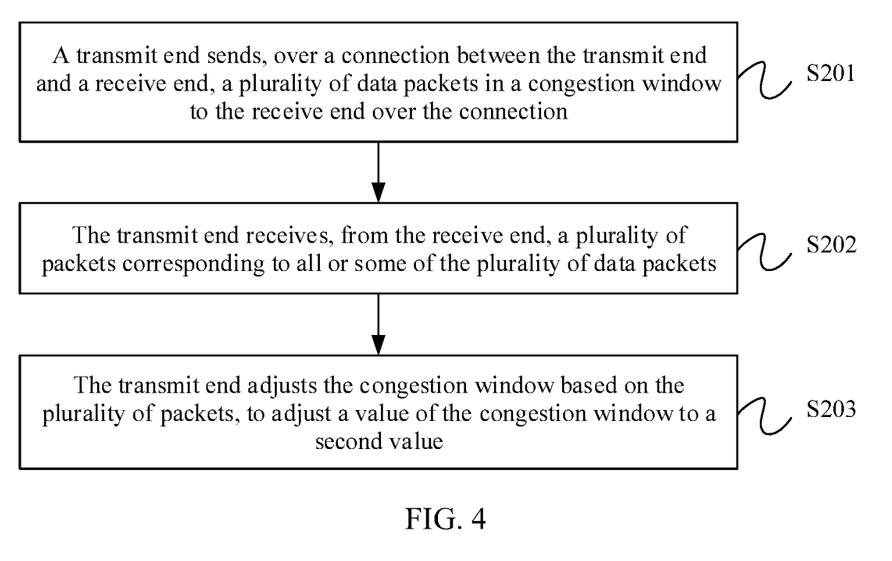
FIG. 4 is a flowchart of a congestion control method according to an embodiment of this application.

The following describes implementation steps of the congestion control method that is performed by a transmit end in the embodiments of this application. FIG. 4 is a flowchart of a congestion control method according to an embodiment of this application. The congestion control method shown in FIG. 4 is applied to a transmit end over a connection. As shown in FIG. 4, the congestion control method includes step S201 to step S203.

Step S201: The transmit end sends, over a connection between the transmit end and a receive end, a plurality of data packets in a congestion window to the receive end over the connection.

A quantity of the plurality of data packets is a first value, and the first value is a value of the congestion window of the connection. The connection is in a congestion avoidance state.

Step S202: The transmit end receives, from the receive end, a plurality of packets corresponding to all or a portion of the plurality of data packets.

The plurality of packets includes one or more first packets and one or more second packets, the first packet is used to indicate that congestion occurs over the connection when one or more of the plurality of data packets are transmitted, and the second packet is used to indicate that no congestion occurs over the connection when one or more of the plurality of data packets are transmitted.

Step S203: The transmit end adjusts the congestion window based on the plurality of packets, to adjust the value of the congestion window to a second value.

One first packet in the plurality of packets enables the value of the congestion window to decrease. One second packet in the plurality of packets enables the value of the congestion window to increase.

For related descriptions of step S201 to step S203, refer to related descriptions of step S101 to step S106 in the foregoing embodiment. Details are not described herein again.

Figure 5:
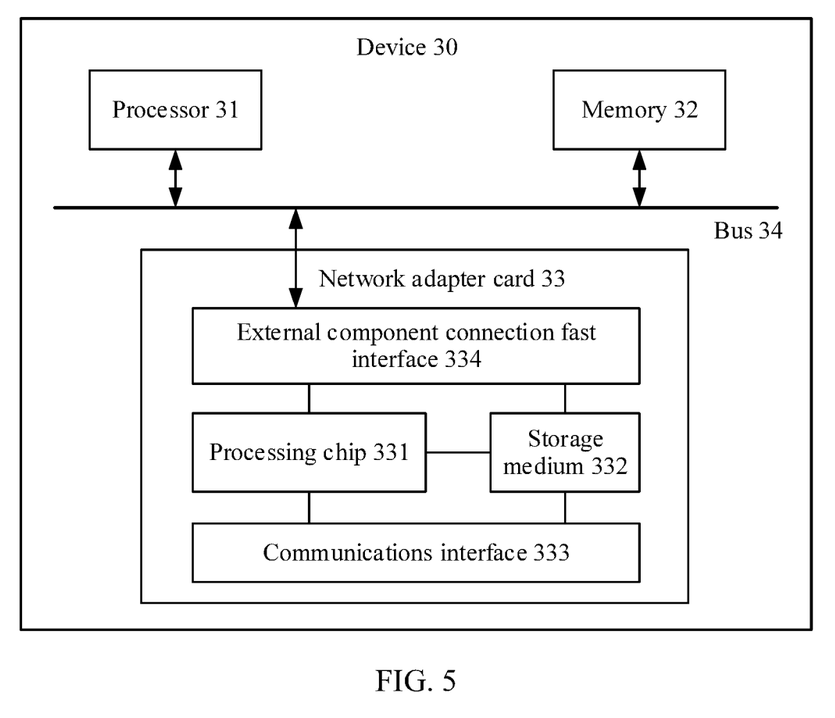
FIG. 5 is a schematic structural diagram of a device according to an embodiment of this application.

The following describes a network interface card and a device in the embodiments of this application. For example, the device may be a terminal, a server, or even a network device such as a cloud platform. FIG. 5 is a schematic structural diagram of a device 30 according to an embodiment of this application. As shown in FIG. 5, the device includes a processor 31, a memory 32, and a network interface card 33. The network interface card 33 may include a processing circuit (for example, an application-specific integrated circuit (ASIC) circuit, a field-programmable gate array (FPGA), or a digital signal processor (DSP), and the processing circuit is shown as a processing chip 331 in FIG. 5), a storage medium 332, and a communications interface 333. In an example, the network interface card 33 may further include a connection interface (where the connection interface is shown as an external component connection fast interface 334 in FIG. 5). In an example, the congestion control method in the foregoing embodiment is applicable to the network interface card 33. That is, the storage medium 332 in the network interface card 33 is configured to store a program. The processing chip 331 is configured to execute a program, and when the program is executed by the processing chip 331, the congestion control method in the foregoing embodiment can be implemented. The external component connection fast interface 334 is configured to connect the network interface card 33 to the device 30. The communications interface 333 is invoked by the processing chip 331 such that the network interface card sends a data packet to another device and receives the foregoing packet. The storage medium 332 may be further configured to store parameters related to the congestion control method, for example, a third value β corresponding to a first packet corresponding to one data packet over a connection in a slow start state, a fourth value β corresponding to a second packet corresponding to one data packet over the connection in the slow start state, a third value β corresponding to a first packet corresponding to one data packet over the connection in a congestion avoidance state, a fifth value α corresponding to a second packet corresponding to one data packet over the connection in the congestion avoidance state, and a value of a congestion window. It should be understood that the network interface card described in FIG. 5 may be installed on various devices. A structure of the device is not limited in this application, and FIG. 5 is merely an example for description.

It should be understood that, similar to the network interface card, the method described in this application may also be applied to a chip or another apparatus. Structures of these apparatuses are similar to the structure of the network interface card, and includes a storage medium, a processing circuit, and a communications interface. The storage medium, the processing circuit, and the communications interface are electrically connected to each other, to implement the foregoing method in this application. Details are not described again in this application.

In another example, the congestion control method in the foregoing embodiment is applicable to the device 30. That is, the memory 32 in the device is equivalent to the storage medium configured to store the program. The processor 31 is equivalent to the processing circuit configured to execute the program in the storage medium. When the program is executed by the processor 31, the congestion control method described in this application can be implemented. The memory 32 in the device is a type of storage medium, and the processor 31 is a type of processing circuit. The network interface card 33 may be considered as an implementation of the communications interface of the device 30. In an implementation, the communications interface of the device 30 may further include a hardware component such as an antenna. The communications interface is mainly configured to implement communication between modules, apparatuses, units, and/or devices in the embodiments of this application. An input device and/or an output device may also be connected through the communications interface.

The processor 31 may include a central processing unit (CPU), or an ASIC, or may be configured as one or more integrated circuits for implementing the embodiments of this application.

The memory 32 may include a large-capacity memory configured to store data or an instruction. By way of example but not limitation, the memory 32 may include a hard-disk drive (HDD), a floppy disk drive, a flash memory, an optical disc, a magnetic disc, a magnetic tape, a Universal Serial Bus (USB) drive, or a combination of two or more of these memories. In an appropriate case, the memory 32 may include a removable medium or an irremovable (or fixed) medium. In an appropriate case, the memory 32 may be disposed inside or outside the device 30. In a specific embodiment, the memory 32 is a non-volatile solid-state memory. In a specific embodiment, the memory 32 includes a read-only memory (ROM). In an appropriate case, the ROM may be a mask programming ROM, a programmable ROM (PROM), an erasable PROM (EPROM), an electrically EPROM (EEPROM), an electrically alterable ROM (EAROM), a flash memory, or a combination of two or more foregoing ROMs.

The processor 31 runs, by reading executable program code stored in the memory 32, a program corresponding to the executable program code, to perform the congestion control method of the transmit end in the foregoing embodiments.

In an example, the device 30 further includes a bus 34. As shown in FIG. 5, the processor 31, the memory 32, and the network interface card 33 are connected and communicate with each other through the bus 34.

The bus 34 includes hardware, software, or both, and couples components of the device with each other. By way of example but not limitation, the bus 34 may include an Accelerated Graphics Port (AGP) bus or another graphics bus, an Extended Industry Standard Architecture (EISA) bus, a front-side bus (FSB), a HyperTransport (HT) interconnection, an Industry Standard Architecture (ISA) bus, an INFINIBAND interconnection, a Low Pin Count (LPC) bus, a memory bus, a Micro Channel architecture (MCA) bus, a Peripheral Component Interconnect (PCI) bus, a PCI Express (PCIe) bus, a Serial Advanced Technology Attachment (SATA) bus, a Video Electronics Standards Association Local Bus (VLB), another appropriate bus, or a combination of two or more foregoing buses. In an appropriate case, the bus 34 may include one or more buses. Although a specific bus is described and shown in this embodiment of this application, any appropriate bus or interconnection is considered in this application.

An embodiment of this application further provides a storage medium. The storage medium stores a program. When the program is executed by a processing circuit, the congestion control method described in this application is implemented. The storage medium may include any medium that can store or transmit information. Examples of the storage medium include an electronic circuit, a semiconductor memory device, a ROM, a flash memory, an erasable ROM (EROM), a floppy disk, a compact-disc (CD) ROM (CD-ROM), an optical disc, a hard disk, an optical fiber medium, a radio frequency (RF) connection, and the like. A program and a code segment can be downloaded through a computer network such as the Internet or an intranet.

Figure 6:
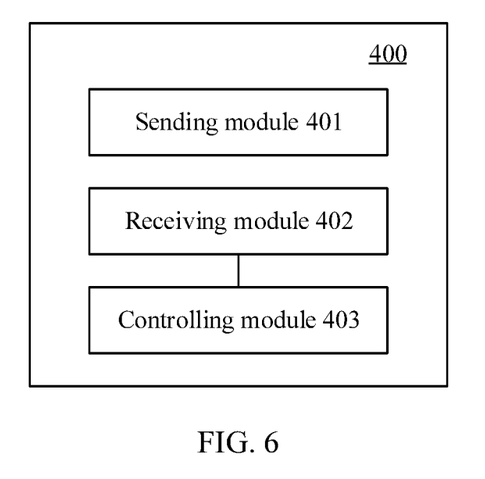
FIG. 6 is a schematic structural diagram of a congestion control apparatus according to an embodiment of this application.

FIG. 6 is a schematic structural diagram of a congestion control apparatus according to an embodiment of this application. As shown in FIG. 6, the congestion control apparatus 400 includes a sending module 401, a receiving module 402, and a controlling module 403. The sending module 401 and the receiving module 402 can be implemented by a processing circuit to execute executable code in a storage medium and by invoking a communications interface. The controlling module 403 can be implemented by the processing circuit to execute an executable program in the storage medium. For specific forms of the processing circuit, the storage medium, and the communications interface, refer to descriptions corresponding to FIG. 5. For descriptions of other implementation details and beneficial effects of the apparatus shown in FIG. 6, refer to the descriptions in this application.

The sending module 401 is configured to send, over a connection between the transmit end and a receive end, a plurality of data packets to the receive end in a congestion window.

A quantity of the plurality of data packets is a first value. The first value is a value of the congestion window of the connection. The connection is in a congestion avoidance state.

In an example, the sending module 401 is further configured to send the plurality of data packets whose quantity is a second value to the receive end over the connection.

The receiving module 402 is configured to receive, from the receive end, a plurality of packets corresponding to all or a portion of the plurality of data packets.

The plurality of packets includes one or more first packets and one or more second packets, the first packet is used to indicate that congestion occurs over the connection when one or more of the plurality of data packets are transmitted, and the second packet is used to indicate that no congestion occurs over the connection when one or more of the plurality of data packets are transmitted.

In an example, the first packet is a congestion notification packet, and the second packet is an ACK character.

In another example, the plurality of packets are ACK packets. Each ACK packet is further used to indicate that a specific quantity of data packets in the plurality of data packets arrive at the receive end. The specific quantity is one or more. The first packet carries a congestion echo flag, and the second packet does not carry a congestion echo flag.

The controlling module 403 is configured to adjust the congestion window based on the plurality of packets, to adjust the value of the congestion window to a second value.

The first packet in the plurality of packets enables the value of the congestion window to decrease, and the second packet in the plurality of packets enables the value of the congestion window to increase.

In an example, one first packet in the plurality of packets enables the value of the congestion window to decrease by a third value, one second packet in the plurality of packets enables the value of the congestion window to increase by a fourth value, the third value is related to a quantity of data packets that the first packet corresponds to, and the fourth value is related to a quantity of data packets that the second packet corresponds to.

In an example, in terms of adjusting the congestion window based on the plurality of packets, the controlling module 403 is configured to decrease the value of the congestion window by the third value based on the one first packet in the plurality of packets, and increase the value of the congestion window by the fourth value based on the one second packet in the plurality of packets.

In an example, in terms of adjusting the congestion window based on the plurality of packets, the controlling module 403 is configured to calculate the second value based on a quantity of the first packets, an amount by which the value of the congestion window is enabled to be decreased by each of the first packets, a quantity of the second packets, and an amount by which the value of the congestion window is enabled to be increased by each of the second packets, and adjust the value of the congestion window from the first value to the second value.

The second value is a sum of the first value, an opposite number of a first sum, and a second sum, where the first sum is a sum of third values corresponding to all first packets in the plurality of packets, and the second sum is a sum of fourth values corresponding to all second packets in the plurality of packets.

In an example, the fourth value is further related to the first value and an increase factor. The increase factor may be a preset value.

The embodiments in this specification are all described in a progressive manner, for same or similar parts in the embodiments, refer to these embodiments, and each embodiment focuses on a difference from other embodiments. Especially, the apparatus embodiments, the device embodiments, and the storage medium embodiments are basically similar to the method embodiments, and therefore are described briefly. For related parts, refer to descriptions in the method embodiments.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A congestion control method implemented by a transmit end, wherein the congestion control method comprises:
    sending, over a connection between the transmit end and a receive end, a plurality of first data packets to the receive end, wherein a first quantity of the first data packets is a first value, and wherein the connection is in a congestion avoidance state;
    receiving, from the receive end, a plurality of second data packets corresponding to all or a portion of the first data packets, wherein the second data packets comprise one or more third data packets and one or more fourth data packets, wherein each of the third data packets comprises an Explicit Congestion Notification Echo (ECE) flag set in a header and indicates that a congestion occurs over the connection when one or more of the first data packets are transmitted, and wherein each of the fourth data packets does not comprise the ECE flag and indicates that the congestion does not occur over the connection when the one or more of the first data packets are transmitted; and
    adjusting, based on the second data packets and a value of the ECE flag set in the header of each of the third data packets, a congestion window of the connection, wherein each of the third data packets enables a second value of the congestion window to decrease, and wherein each of the fourth data packets enables the second value to increase.

2. The congestion control method of claim 1, wherein each of the third data packets is a congestion notification packet (CNP), and wherein each of the fourth data packets comprises an acknowledgment (ACK) character.

3. The congestion control method of claim 1, wherein the second data packets are acknowledgement (ACK) packets, wherein each of the ACK packets indicates a second quantity of the first data packets arriving at the receive end, and wherein the second quantity is greater than or equal to one.

4. The congestion control method of claim 1, wherein each of the third data packets enables the second value to decrease by a third value, wherein each of the fourth data packets enables the second value to increase by a fourth value, wherein the third value is related to a third quantity of the first data packets that each of the third data packets corresponds to, and wherein the fourth value is related to a fourth quantity of the first data packets that each of the fourth data packets corresponds to.

5. The congestion control method of claim 1, wherein the first value is the second value, wherein the congestion control method further comprises adjusting the second value to a fifth value, wherein the fifth value is a sum of the first value, a negative number of a first sum, and a second sum, wherein the first sum is a sum of third values corresponding to all the third data packets, and wherein the second sum is a sum of fourth values corresponding to all the fourth data packets.

6. The congestion control method of claim 1, further comprising:
    decreasing the second value by a third value based on each of the third data packets; and
    increasing the second value by a fourth value based on each of the fourth data packets.

7. The congestion control method of claim 1, further comprising:
    calculating a sixth value based on a fifth quantity of the third data packets, a first amount by which the second value is enabled to be decreased by each of the third data packets, a sixth quantity of the fourth data packets, and a second amount by which the second value is enabled to be increased by each of the fourth data packets; and
    adjusting the second value to the sixth value.

8. A device comprising:
    a memory configured to store instructions; and
    a processor coupled to the memory, wherein the instructions cause the processor to be configured to:
        send, over a connection between a transmit end and a receive end, a plurality of first data packets to the receive end, wherein a first quantity of the first data packets is a first value, and wherein the connection is in a congestion avoidance state;

receive, from the receive end, a plurality of second data packets corresponding to all or a portion of the first data packets, wherein the second data packets comprise one or more third data packets and one or more fourth data packets, wherein each of the third data packets comprises an Explicit Congestion Notification Echo (ECE) flag set in a header and indicates that a congestion occurs over the connection when one or more of the first data packets are transmitted, and wherein each of the fourth data packets does not comprise the ECE flag and indicates that the congestion does not occur over the connection when the one or more of the first data packets are transmitted; and adjust, based on the second data packets and a value of the ECE flag set in the header of each of the third data packets, a congestion window of the connection, wherein each of the third data packets enables a second value of the congestion window to decrease, and wherein each of the fourth data packets enables the second value to increase.

9. The device of claim 8, wherein each of the third data packets is a congestion notification packet (CNP), and wherein each of the fourth data packets comprises an acknowledgment (ACK) character.

10. The device of claim 8, wherein the second data packets are acknowledgement (ACK) packets, wherein each of the ACK packets indicates that a second quantity of the first data packets arriving at the receive end, and wherein the second quantity is greater than or equal to one.

11. The device of claim 8, wherein each of the third data packets enables the second value to decrease by a third value, wherein each of the fourth data packets enables the second value to increase by a fourth value, wherein the third value is related to a third quantity of the first data packets that each of the third data packets corresponds to, and wherein the fourth value is related to a fourth quantity of the first data packets that each of the fourth data packets corresponds to.

12. The device of claim 8, wherein the instructions further cause the processor to be configured to:
decrease the second value by a third value based on each of the third data packets; and
increase the second value by a fourth value based on each of the fourth data packets.

13. The device of claim 8, wherein the first value is the second value, wherein the instructions further cause the processor to be configured to adjust the second value to a fifth value, wherein the fifth value is a sum of the first value, a negative number of a first sum, and a second sum, wherein the first sum is a sum of third values corresponding to all the third data packets, and wherein the second sum is a sum of fourth values corresponding to all the fourth data packets.

14. The device of claim 8, wherein the instructions further cause the processor to be configured to:
calculate a sixth value based on a fifth quantity of the third data packets, a first amount by which the second value is enabled to be decreased by each of the third data packets, a sixth quantity of the fourth data packets, and a second amount by which the second value is enabled to be increased by each of the fourth data packets; and
adjust the second value to the sixth value.

15. A non-transitory computer-readable medium comprising computer-executable instructions that, when executed by one or more processors, cause a device to:

send, over a connection between a transmit end and a receive end, a plurality of first data packets to the receive end, wherein a first quantity of the first data packets is a first value, and wherein the connection is in a congestion avoidance state;

receive, from the receive end, a plurality of second data packets corresponding to all or a portion of the first data packets, wherein the second data packets comprise one or more third data packets and one or more fourth data packets, wherein each of the third data packets comprises an Explicit Congestion Notification Echo (ECE) flag set in a header and indicates that a congestion occurs over the connection when one or more of the first data packets are transmitted, and wherein each of the fourth data packets does not comprise the ECE flag and indicates that the congestion does not occur over the connection when the one or more of the second data packets are transmitted; and adjust, based on the second data packets and a value of the ECE flag set in the header of each of the third data packets, a congestion window of the connection, wherein each of the third data packets enables a second value of the congestion window to decrease, and wherein each of the fourth data packets enables the second value to increase.

16. The non-transitory computer-readable medium of claim 15, wherein each of the third data packets is a congestion notification packet (CNP), and wherein each of the fourth data packets comprises an acknowledgment (ACK) character.

17. The non-transitory computer-readable medium of claim 15, wherein the second data packets are acknowledgement (ACK) packets, wherein each of the ACK packets indicates that a second quantity of the first data packets arriving at the receive end, and wherein the second quantity is greater than or equal to one.

18. The non-transitory computer-readable medium of claim 16, wherein each of the third data packets enables the second value to decrease by a third value, wherein each of the fourth data packets enables the second value to increase by a fourth value, wherein the third value is related to a third quantity of the first data packets that each of the third data packets corresponds to, and wherein the fourth value is related to a fourth quantity of the first data packets that each of the fourth data packets corresponds to.

19. The non-transitory computer-readable medium of claim 16, wherein the computer-executable instructions further cause the device to:
decrease the second value by a third value based on each of the third data packets; and
increase the second value by a fourth value based on each of the fourth data packets.

20. The non-transitory computer-readable medium of claim 16, wherein the first value is the second value, wherein the computer-executable instructions further cause the device to adjust the second value to a fifth value, wherein the fifth value is a sum of the first value, a negative number of a first sum, and a second sum, wherein the first sum is a sum of third values corresponding to all the third data packets, and wherein the second sum is a sum of fourth values corresponding to all the fourth data packets.

* * * * *